(No Model.)

G. W. WILLFORD.
APPARATUS FOR MANUFACTURING PLATE OR LEAF SPRINGS.

No. 560,074. Patented May 12, 1896.

Witnesses,
Robert Everett,
Geo. N. Rea.

Inventor,
George W. Willford.
By James L. Norris.
Atty.

(No Model.) 3 Sheets—Sheet 2.
G. W. WILLFORD.
APPARATUS FOR MANUFACTURING PLATE OR LEAF SPRINGS.
No. 560,074. Patented May 12, 1896.
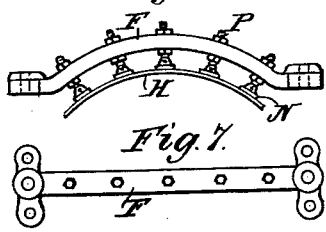
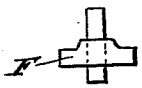
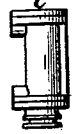
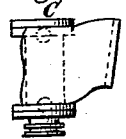
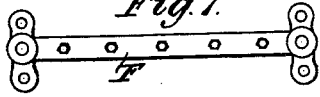
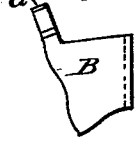
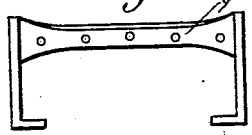
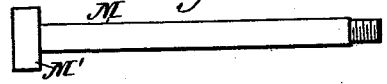
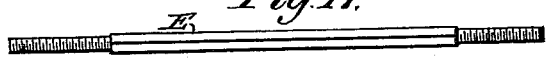
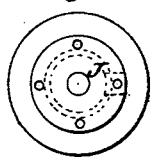
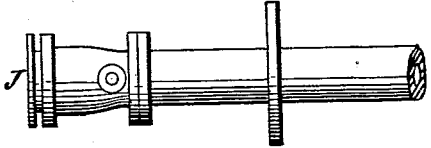
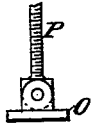
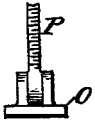
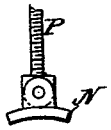
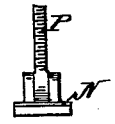
Witnesses.
Inventor.
George W. Willford.
By James L. Norris.
Atty.

(No Model.) 3 Sheets—Sheet 3.
G. W. WILLFORD.
APPARATUS FOR MANUFACTURING PLATE OR LEAF SPRINGS.
No. 560,074. Patented May 12, 1896.
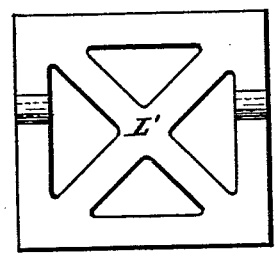
Fig. 26.
Fig. 27.
Fig. 28.
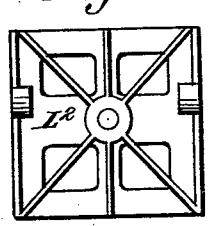
Fig. 29.
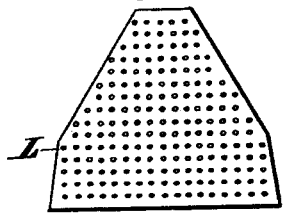
Fig. 31.
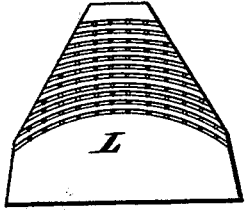
Fig. 33.
Fig. 34.
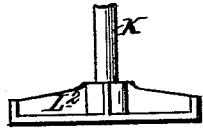
Fig. 30.
Fig. 32.
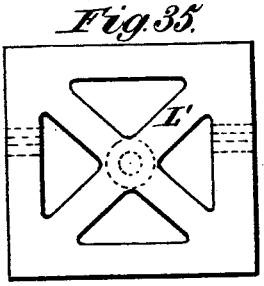
Fig. 35.
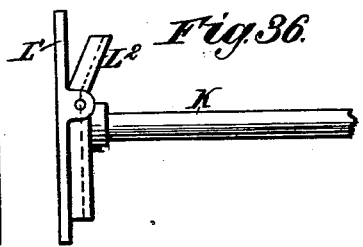
Fig. 36.
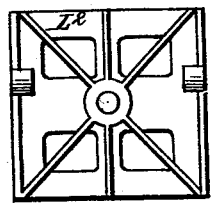
Fig. 37.
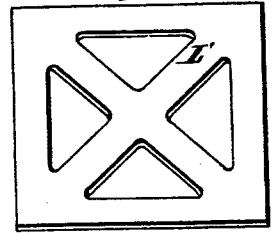
Fig. 38.
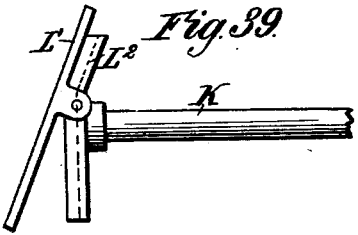
Fig. 39.
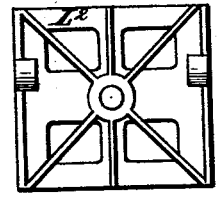
Fig. 40.
Witnesses.
Inventor.
George W. Willford.
By James L. Norris.
Atty.

UNITED STATES PATENT OFFICE.

GEORGE WILLIAM WILLFORD, OF SHEFFIELD, ENGLAND.

APPARATUS FOR MANUFACTURING PLATE OR LEAF SPRINGS.

SPECIFICATION forming part of Letters Patent No. 560,074, dated May 12, 1896.

Application filed September 26, 1895. Serial No. 563,792. (No model.) Patented in England October 7, 1893, No. 18,802.

*To all whom it may concern:*

Be it known that I, GEORGE WILLIAM WILLFORD, spring manufacturer, a subject of the Queen of Great Britain, residing at Park House Works, Attercliffe, Sheffield, in the county of York, England, have invented new and useful Improvements in Machinery or Apparatus for the Manufacture of Plate or Leaf Springs, (for which I, in conjunction with Frank Cocking, have obtained a patent in Great Britain, No. 18,802, bearing date October 7, 1893,) of which the following is a specification.

This invention relates to improvements in manufacturing plate or leaf springs; and it consists of a machine worked by hydraulic power, in combination with a cistern of water, the apparatus being fixed at such an angle relatively to the cistern that the leaves or plates under manipulation may be conveniently lowered into the cistern for the purpose of hardening and again raised therefrom, the whole of the arrangements greatly facilitating the manufacture and rendering it more simple than heretofore.

Any kind of wagon, carriage, or buffer spring may be manufactured with my improved machinery.

In order that my said invention may be particularly described and ascertained, reference is hereby made to the accompanying drawings, in which similar letters of reference indicate corresponding parts.

Figure 1:
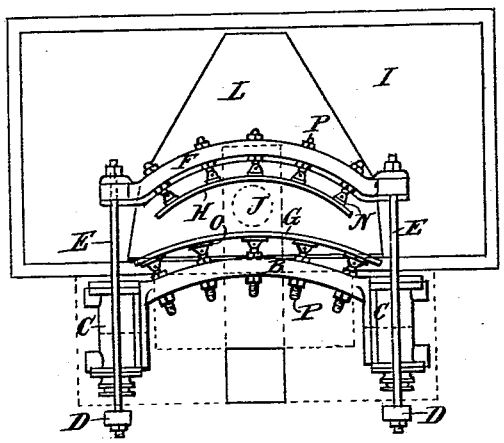
Figure 2:
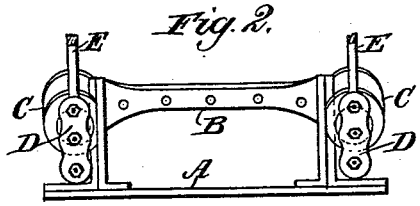
Figure 3:
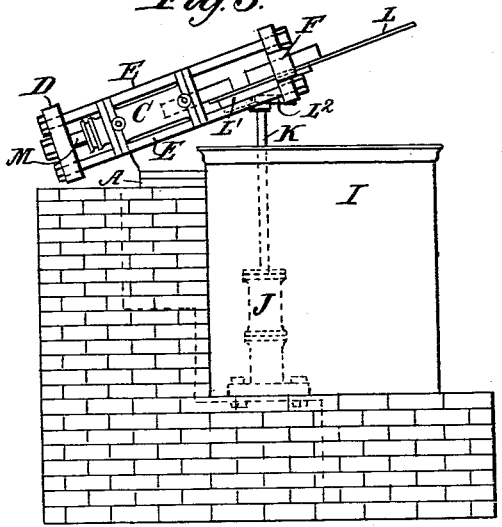
Figure 4:
Figure 5:

Figure 1 is a plan of the machine. Fig. 2 is a front elevation of Fig. 1. Fig. 3 is a side elevation. Fig. 4 is a detail side view, and Fig. 5 a similar end view of the piston, piston-rod, cross-head, and side rods of one of the hydraulic cylinders C. Fig. 6 is a plan of the camber-head F. Fig. 7 is a view taken at right angles to Fig. 6, and Fig. 8 is an end view of the same. Fig. 9 is a plan of the camber-head B. Fig. 10 is a view of the same at right angles to Fig. 9, and Fig. 11 is an end view of the same. Fig. 12 is a plan, Fig. 13 a side view, and Fig. 14 an end view, of one of the cylinders C C. Fig. 15 is a plan view of the piston-head, and Fig. 16 a side view of the piston head and rod, fitted to the cylinders C C, drawn to an enlarged scale. Fig. 17 is a view of one of the rods E. Fig. 18 is a plan, and Fig. 19 a side view, of the cylinder J. Figs. 20 and 21 are detail views of the shoes O O with the pivoted screws P attached thereto, and Figs. 22 and 23 are similar views of the shoes N and pivoted screws P. Figs. 24 and 25 are enlarged detail views of the screws P. Fig. 26 is a plan, and Fig. 27 a side view, of the top frame for supporting the table L. Fig. 29 is a plan, Fig. 28 a side view, and Fig. 30 an end view, of the bottom frame of the table L. Fig. 31 is a plan showing one form of the table L with perforations to facilitate the access of the water to the plates when lowered into the tank for the purpose of hardening, and Fig. 32 is an edge view of the same. Fig. 33 is a plan showing another method of constructing the plate L with curved grooves for keeping the spring-plates apart while being hardened, and perforations for the passage of the water; and Fig. 34 is an end view of the same. Fig. 35 is a top view of the top frame L' of the table in a horizontal position. Fig. 36 is a side view of the same, showing the top frame L', the bottom frame L² angled for the purpose of tipping the table L, and the ram K, to which the whole is fitted; and Fig. 37 is a bottom view showing the under side of the bottom frame L². Fig. 38 is a plan, and Fig. 39 a side view, showing the top frame L' placed at a suitable angle to the ram. Fig. 40 is a view of the bottom frame.

A is the foundation-plate of the machine, to which the lower camber-head B and hydraulic cylinders C C are bolted, as shown in Figs. 1, 2, and 3.

D D are cross-heads bolted to the piston-rods M and also to the connecting-rods E E. The other ends of the rods E E are bolted to the upper camber-head F. The rods E E are guided in ordinary guide-bearings attached to the cylinders. These rods are preferably formed square in section.

G is a flexible camber-plate secured to the lower camber-head B by means of shoes O O and pivoted screws and nuts P P. H is also a flexible camber-plate, similarly fitted to the upper camber-head F by means of shoes N and pivoted screws and nuts P P.

J is a vertical hydraulic cylinder fitted with a plunger K. This cylinder stands in the water-tank I, as shown by dotted lines in Fig. 3. The upper end of the plunger or piston K is fitted with a frame $L^2$. (Shown separately in Figs. 28, 29, 30, 37, and 40.) This frame $L^2$ supports a pivoted frame $L'$. (Shown separately in Figs. 26, 27, 35, and 38.) The lower frame $L^2$ is so formed that the upper frame $L'$, pivoted thereto, is capable of assuming the angular position shown in Figs. 3 and 39, corresponding with the angle of the cylinders C C and their fittings, or a horizontal position, as shown in Fig. 36. The plate $L'$ carries a table L, which may be formed either as shown in Figs. 31 and 32 or in Figs. 33 and 34. The usual valves and other ordinary appliances are fitted to the hydraulic cylinders. The angle of the cylinders and the position of the cistern I are so arranged that the plates L, $L'$, and $L^2$ can be conveniently lowered into the tank or cistern with the plates for the purpose of hardening, and again raised therefrom.

The pivoted plate $L'$ is so fitted to the frame $L^2$ that, when the plunger K rises, the pivoted plate $L'$ comes directly under the camber-head and is thereby caused to assume the required angle, supporting the table L at the same angle, as shown in Fig. 3. While at this angle the spring-plates are taken from the furnace and placed upon the table. Pressure is then admitted to the upper ends of the cylinders, which forces down the upper camber-head F and presses the spring-plates to the required camber. The upper camber-head F is then raised by the reversal of the valves, the plates remaining on edge upon the table L. The plunger K is then lowered, the table L falling into a horizontal position. The plates are then distributed upon the table to insure equal access of the water when in the cistern for the purpose of hardening, the table with the plates being lowered into the water for that purpose.

The corrugated table, Figs. 33 and 34, is useful in retaining the separated plates after bending at suitable distances apart and preventing their getting out of shape while being hardened.

What I claim as my invention is—

1. In apparatus for the manufacture of plate or leaf springs, the combination of a cistern for containing water, a vertical hydraulic cylinder located in said cistern and fitted with a plunger, a table pivotally mounted on said plunger and adapted for the support of the plates or springs to be lowered into the cistern, upper and lower camber-heads between which the plates or springs are placed for bending, and hydraulic cylinders having their pistons connected with the upper camber-head for operating the same, substantially as described.

2. In apparatus for the manufacture of plate or leaf springs, the combination of a cistern for containing water, a vertical hydraulic cylinder located in said cistern and provided with a plunger, an adjustably-mounted table carried by said plunger and adapted for the support of the plates or springs to permit lowering them into the cistern, upper and lower camber-heads each provided with a flexible camber-plate, hydraulic cylinders provided with pistons, a cross-head on each piston-rod, and rods to connect said cross-heads with the upper camber-head, substantially as described.

Dated this 29th day of August, 1895.

GEORGE WILLIAM WILLFORD.

Witnesses:
D. W. POSSETT,
N. C. GREGORY.